(12) United States Patent
Moulding et al.

(10) Patent No.: US 6,904,771 B2
(45) Date of Patent: Jun. 14, 2005

(54) METHOD OF FORMING AND TRANSPORTING CURVED GLASS

(75) Inventors: Frank E. Moulding, South Lyon, MI (US); Larry J. Scott, Jr., Charlotte, TN (US); Robert Croft, Plymouth, MI (US); Ronald Vandergrift, Mt. Juliet, TN (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 509 days.

(21) Appl. No.: 10/205,065

(22) Filed: Jul. 25, 2002

(65) Prior Publication Data

US 2004/0016263 A1 Jan. 29, 2004

(51) Int. Cl.$^7$ ............................................. C03B 23/03
(52) U.S. Cl. ............................ 65/106; 65/289; 65/291
(58) Field of Search ........................ 65/106, 273, 287, 65/289, 111, 117, 118, 275, 290, 291

(56) References Cited

U.S. PATENT DOCUMENTS

| | | |
|---|---|---|
| 3,459,526 A | 8/1969 | Stickel et al. |
| 4,221,580 A | 9/1980 | Frank |
| 4,516,997 A | 5/1985 | Derner et al. |
| 4,556,408 A | 12/1985 | Fecik et al. |
| 4,711,653 A * | 12/1987 | Frank et al. .................. 65/106 |
| 4,775,404 A | 10/1988 | Klempner et al. |
| 5,004,491 A * | 4/1991 | McMaster et al. ............ 65/106 |
| 5,090,989 A | 2/1992 | Adoline |
| 5,122,177 A | 6/1992 | Yoshizawa et al. |
| 5,226,942 A | 7/1993 | Letemps et al. |
| 5,286,271 A * | 2/1994 | Rueter et al. .................. 65/106 |
| 5,320,661 A * | 6/1994 | Fecik et al. ................... 65/104 |
| 5,393,316 A * | 2/1995 | Sugiyama et al. ............ 65/106 |
| 5,403,369 A * | 4/1995 | McMaster .................... 65/25.4 |
| 5,437,703 A * | 8/1995 | Jacques et al. ............... 65/106 |
| 5,472,470 A * | 12/1995 | Kormanyos et al. .......... 65/287 |
| 5,858,047 A * | 1/1999 | Frank et al. .................. 65/104 |
| 6,032,491 A * | 3/2000 | Nitschke et al. .............. 65/171 |
| 6,038,887 A | 3/2000 | Vild et al. |
| 6,422,040 B1 * | 7/2002 | McMaster et al. ............ 65/106 |

* cited by examiner

*Primary Examiner*—Steven P. Griffin
*Assistant Examiner*—Carlos Lopez
(74) *Attorney, Agent, or Firm*—MacMillan, Sobanski & Todd LLC

(57) ABSTRACT

A glass forming assembly and method for forming complex shaped glass, with the glass forming assembly having a hood assembly including a hood lift superstructure movable horizontally back and forth over a cold ring and a cooling shuttle and movable vertically relative to the cold ring and the cooling shuttle, and a hood frame supported by the hood lift superstructure by a hood tilt mechanism. The hood tilt mechanism includes an air cylinder assembly actuable to tilt the hood frame relative to the hood lift superstructure, which allows for proper orientation of the glass prior to dropping it on the cooling shuttle, thus allowing for reduced glass chipping and cracking.

4 Claims, 4 Drawing Sheets

METHOD OF FORMING AND TRANSPORTING CURVED GLASS

BACKGROUND OF INVENTION

The present invention relates to glass forming and transport mechanisms, and in particular to glass forming and transport mechanisms to shape curved glass, such as, for example, glass in vehicles.

Glass components used in automobiles, such as windshields, are often complex shaped parts. During the shaping process, hot glass enters a vacuum mold and is shaped close to its final shape. The glass needs to be brought into the mold at a predetermined angle on a hot ring in order to allow for proper shaping. The mold drops down and picks up the glass off of the hot ring via vacuum pressure. The hot ring is removed, and then a cold ring is brought under the glass, with the glass released onto the cold ring from the mold. The glass is then picked up by a hood via a vacuum pressure. The hood has teeth that are adjustable and, since the glass is still hot, can shape the glass slightly. So, if the hood is mis-adjusted, the glass can be mis-shaped. The hood transports the glass over the top of cooling conveyor pads on a shuttle (a cooling conveyer with fans for cooling the glass). Since it is glass, and so somewhat brittle, the glass must be at the proper angle when dropped onto the pads of the shuttle or it has a greater tendency to chip or crack. For particularly complex shaped glass, such as vehicle windshields with complex curvature, assuring the proper angle can be difficult, especially since, for the complex shaped glass, this angle can be different than that needed in the mold. The orientation of the glass during the shaping process, then, is typically driven by the need for a proper orientation of the glass as it is placed on a cooling shuttle from a hood. If the placement of the glass on the cooling shuttle does not allow for the glass to contact all of the shuttle pads essentially at the same time, the glass will have a tendency to chip and crack. Since conventionally, the tilt of the hood is fixed, the glass tilt relative to the shuttle pads cannot be adjusted while the hood is moving the glass from the cold ring to the shuttle. Because of this, the orientation of the glass as it is brought into the vacuum mold would not be optimum.

In order to assure the proper angle at the time of dropping the glass onto the shuttle pads, then, and assuring optimum orientation of the glass in the vacuum mold, the glass forming process requires the use of an articulated hot ring tool when forming the complex shapes. An articulated hot ring has hinges on a pair of opposite sides (for a windshield, this is typically the driver and passenger sides). But articulated hot rings are generally not desirable if a non-articulated hot ring can be employed instead. By employing a non-articulated hot ring instead of an articulated hot ring, the cycle time for forming the glass can be reduced, there is less scrap because there won't be any hinge kinks, as can happen with articulated tooling, as well as a reduction in glass chips, which can occur when an air suspension block drops the glass onto the hinges of the articulated hot ring. Further, the tooling will require less maintenance because of the reduced number of moving components.

Thus, it is desirable to have a glass forming system and process that overcomes the drawbacks of the prior systems, which require an articulated hot ring in order to form complex shaped glass parts and have the glass at the optimum orientation when dropped onto the pads of the cooling conveyer.

SUMMARY OF INVENTION

In its embodiments, the present invention contemplates a glass forming assembly for forming complex shaped glass. The assembly includes a cold ring, a cooling shuttle, and a hood assembly. The hood assembly has a hood lift superstructure movable horizontally back and forth over the cold ring and the cooling shuttle and movable vertically relative to the cold ring and the cooling shuttle, a hood frame supported by the hood lift superstructure by a hood tilt mechanism, with the hood tilt mechanism including an air cylinder assembly actuable to tilt the hood frame relative to the hood lift superstructure.

The present invention further contemplates a method of forming glass into a complex shape comprising the steps of: heating the glass; supporting the glass on a hot ring; moving the hot ring into a mold; shaping the glass; supporting the glass on a cold ring; moving the cold ring out of the mold; lifting the glass from the cold ring by vacuum pressure from a hood assembly; moving the hood assembly horizontally over a cooling shuttle; lowering a hood lift superstructure to be adjacent to the cooling shuttle; and tilting a hood frame portion of the hood lift superstructure downward thereby reorienting the glass relative to the cooling shuttle; and releasing the vacuum pressure from the hood assembly to thereby drop the glass onto the cooling shuttle.

An embodiment of the present invention allows for the adjustment of the orientation of a complex shaped glass part, such as a windshield, as it is carried by a hood, before it is dropped onto a cooling conveyer.

An advantage of the present invention is that, since the hood can tip, the glass can be brought into a vacuum mold on a hot ring at a better orientation to the mold, without requiring the use of an articulated hot ring. By eliminating the need for an articulated hot ring, cycle time for glass forming, scrap, and maintenance time can be reduced.

DETAILED DESCRIPTION

Figure 1:
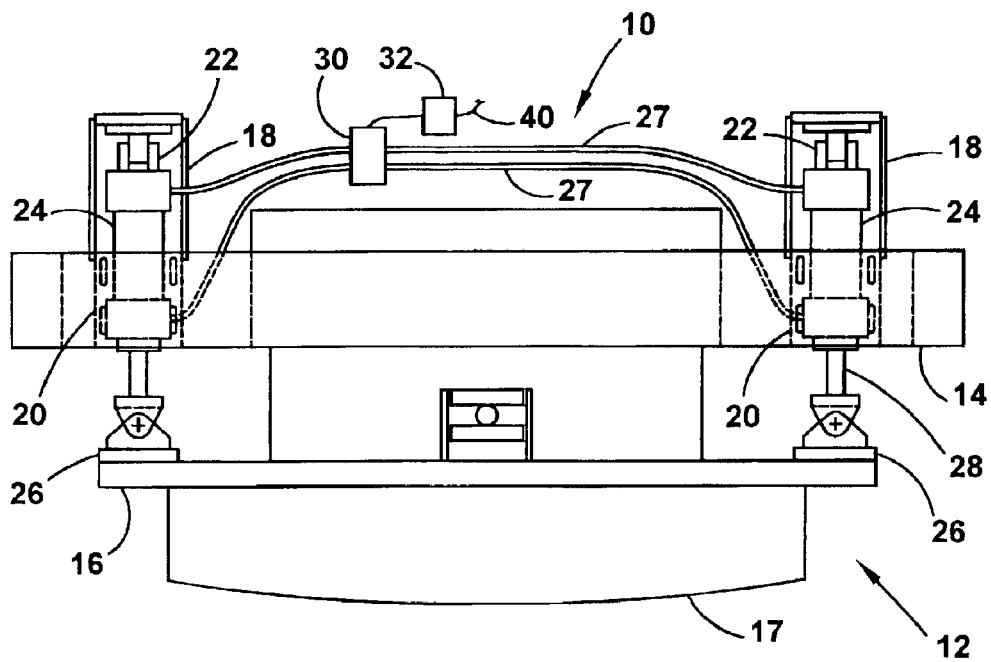
FIG. 1 is a schematic, front view of a portion of a hood employed in a glass forming process, in accordance with the present invention.
Figure 2B:
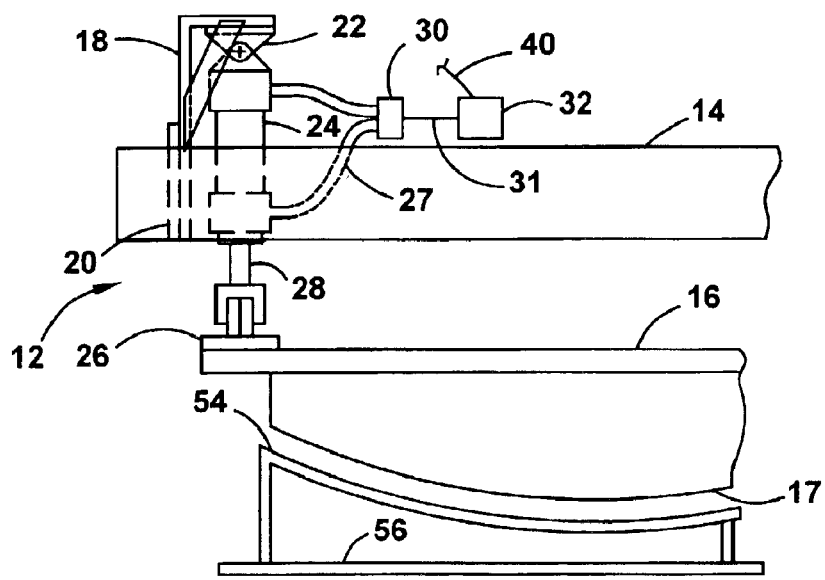
FIGS. 2a–2d are a schematic, side views of a portion of the hood shown in FIG. 1, as the hood moves through its portion of the glass forming process.
Figure 2A:
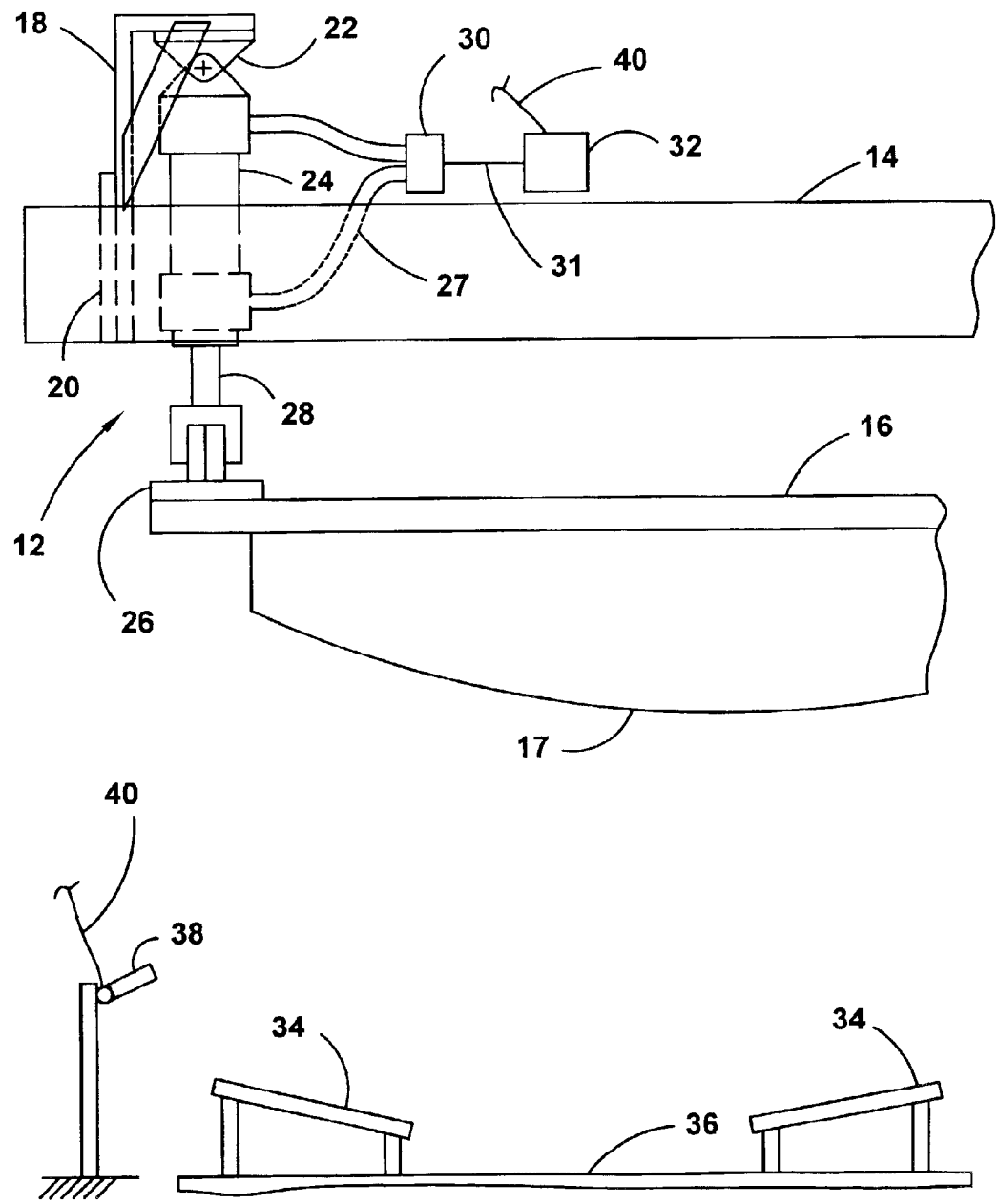
Figure 2C:
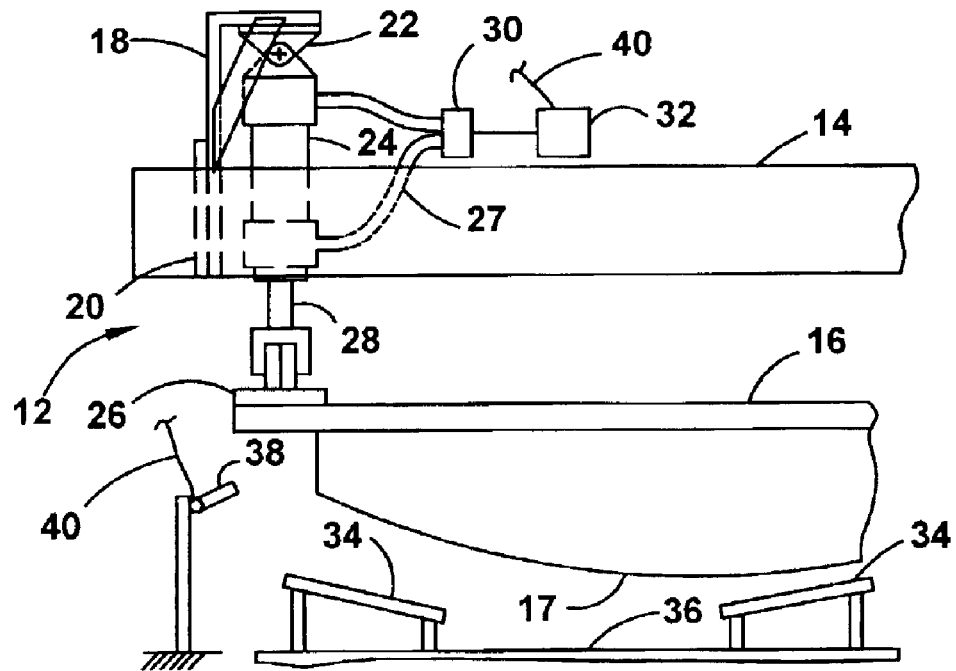
Figure 2D:
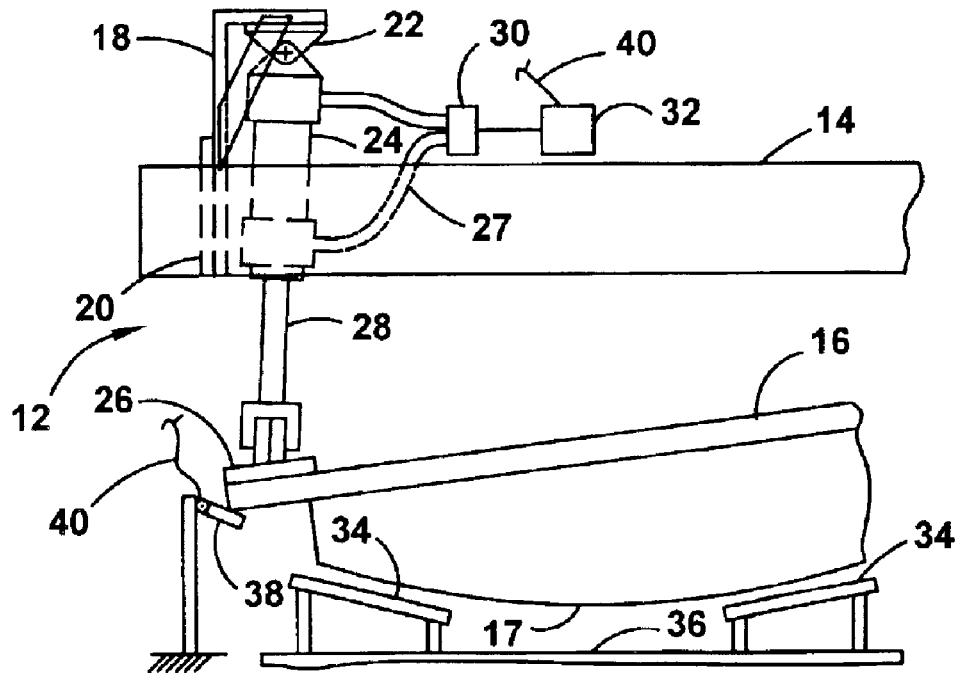

FIGS. 1 and 2a–2d illustrate a hood assembly 12 portion of a glass forming assembly 10. The hood assembly 12 includes a hood lift superstructure 14, which is mounted to the glass forming assembly 10 and is only movable in the horizontal and vertical direction, and a hood frame 16, which mounts to and is supported by the hood lift superstructure 14. The bottom side 17 of the hood frame 16 is shaped to receive the glass and hold it by vacuum pressure. A first end of the hood frame 16 is pivotally mounted to the hood lift superstructure 14, while a second end is mounted to and supported by the hood lift superstructure 14 via a pair of hood tilt mechanisms 18.

The hood tilt mechanisms 18 each include an adjustable hood lift mounting bracket 20, which is fastened to the hood lift superstructure 14 via slotted holes that allow for accurate alignment of the hood tilt mechanism 18 relative to the hood lift superstructure 14. Each of the hood tilt mechanisms 18 also include an adjustable clevis mount bracket 22 under which an air cylinder 24 is pivotally mounted. Each air cylinder 24 then pivotally connects at its other end to a hood frame bracket 26, which is preferably welded to the hood frame 16. The hood frame brackets 26 preferably pivot about an axis that is at an angle of about ninety degrees from the pivot axis of the clevis brackets 22 in order to allow for horizontal misalignment to accrue without damaging or having to reposition adjacent structures in the glass forming assembly 10.

Each air cylinder 24 is connected to a pair of hoses 27, with each one of the hoses 27 connecting to a different side of a piston (not shown) in the air cylinder 24, for telescopically actuating a rod 28 connected to the piston. The other ends of the air hoses 27 are connected to a single solenoid valve 30, which in turn, is connected to a conventional source of pressurized air (not shown). By connecting both sets of hoses 27 to a single valve, the air cylinders 24 can act in unison when raising or lowering that end of the hood frame 16. The valve 30 is electrically connected 31 to and controlled by a controller 32, which receives input from other portions of the glass forming assembly 10 in order to provide the proper timing for actuating the air cylinders 24. By actuating the cylinders 24, this allows for the hood frame 16 to tilt, thus tipping the glass as it is supported by the hood frame 16, even though the hood lift superstructure 14 can only move horizontally and vertically.

At one end of the hood lift superstructure travel, it will be located over pads 34 on a cooling shuttle 36. Located adjacent to the cooling shuttle 36 is a reed switch 38, which is electrically connected 40 to the controller 32. When the hood frame 16 is over the pads 34 and the air cylinders 24 are extended, the reed switch 38 will be actuated and send a signal to the controller 32 indicating that the cylinders 24 are extended. The controller 32 will then prevent the cooling shuttle 36 from moving the pads 34 until the controller 32 receives an indication from the reed switch 38 that the cylinders 24 have been retracted.

Figure 3:
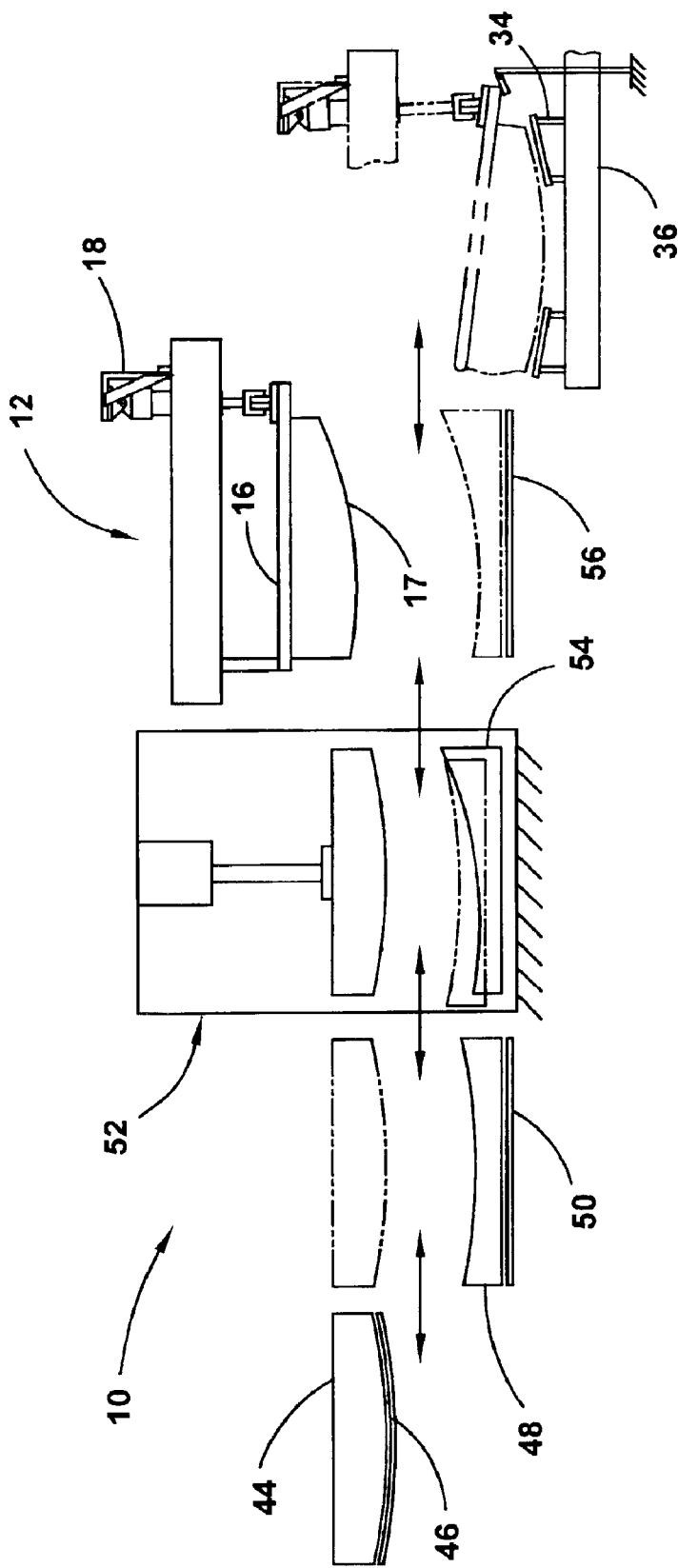
FIG. 3 is a schematic view of a portion of the stations employed during a glass forming process in accordance with the present invention.

FIGS. 2a–2d and 3 illustrate several of the stations of the glass forming assembly and how the hood frame 16 is manipulated in order to move the glass from one station to another. An air suspension block 44 carries the hot glass 46 from a heating apparatus (not shown), supporting the glass 46 via a large vacuum/small positive pressure on top of the glass 46 that suspends the glass just below the block. The solid outline of the particular station in FIG. 3 illustrates where the glass 46 is first supported by that station, while the phantom outline of that station is where the glass 46 is released from that particular station. The air suspension block 44 releases the glass 46 onto a non-articulated hot ring 48 at the desired angle for molding the glass 46. The heated glass 46 on the hot ring 48 then moves, via a first shuttle 50, into a vacuum mold 52. The mold 52 comes down and lifts the glass 46, via vacuum pressure, and molds it. While molding the glass 46, the hot ring 48 moves out from under the glass 46 and a cold ring 54, via a second shuttle 56, moves into the vacuum mold 52 under the glass 46. The vacuum mold 52 lowers the glass 46 and releases it onto the cold ring 54, which then moves out of the molding station 52. The hood 12 moves over the top of the cold ring 54 in its up position, and then the hood lift superstructure 14 is lowered down to the cold ring 54 in its cold ring pick up position (position shown in FIG. 2b). The hood 12 picks up the glass 46, via vacuum pressure, off of the cold ring 54, and lifts it to its up position and moves horizontally over the top of the cooling shuttle 36 (position shown in FIG. 2a). The hood 12 lowers the hood lift superstructure 14 down to an initial drop position (position shown in FIG. 2c). The controller 32 actuates the solenoid valve 30 causing the rods 28 of the air cylinders 24 to extend downward, thus tilting the hood frame 16 so that the bottom surface 17 of the hood frame 16 will be essentially equidistant from the pads 34 of the cooling shuttle 36, and the reed switch 38 is activated (position shown in FIG. 2d). The vacuum in the hood frame 16 is then released, dropping the glass 46 onto the pads 34 at the proper orientation, thus avoiding chipping or breakage. The controller 32 will then actuate the solenoid 30 in the opposite direction, causing the rods 28 to retract into the air cylinders 24 and deactivating the reed switch 38. Until the reed switch 38 is deactivated, the controller 32 will prevent the cooling shuttle 36 from moving the glass. As an alternative to handling all of the movements of the hood frame 16 sequentially, the air cylinder can be actuated to tilt the hood frame 16 as the hood lift superstructure 14 is moving the hood frame 16 horizontally and/or vertically. The cooling conveyer 36 then moves the glass 46 past fans (not shown), allowing the glass 46 to cool.

In the case of a vehicle windshield, for example, the hood tilt mechanism 18 allows the roof edge of the windshield to be lowered at the unload position of the hood frame 16 such that the roof and cowl centers are horizontal, thus allowing for an even drop onto the pads 34 of the cooling shuttle 36. This even drop greatly reduces the chances for breakage and stress fractures in the windshield. This allows for the windshield glass to be brought in to the vacuum mold 52 at a better orientation on the hot ring 48 since the hood 12 can tilt the windshield to a different orientation prior to placing it on the cooling shuttle 36. This better orientation allows the hot ring 48 to support the glass at the desired orientation without having to be articulated, thus reducing the cost of the hot ring 48, and improving the cycle time for forming the glass.

While certain embodiments of the present invention have been described in detail, those familiar with the art to which this invention relates will recognize various alternative designs and embodiments for practicing the invention as defined by the following claims.

What is claimed is:

1. A method of forming glass into a complex shape comprising the steps of:
   heating the glass;
   supporting the glass on a hot ring;
   moving the hot ring into a mold;
   shaping the glass;
   supporting the glass on a cold ring;
   moving the cold ring out of the mold;
   lifting the glass from the cold ring by vacuum pressure from a hood assembly;
   moving the hood assembly horizontally over a cooling shuttle;
   lowering a hood lift superstructure to be adjacent to the cooling shuttle;
   tilting a hood frame portion of the hood lift superstructure downward thereby reorienting the glass relative to the cooling shuttle; and
   releasing the vacuum pressure from the hood assembly to thereby drop the glass onto the cooling shuttle.

2. The method of claim 1 further including the steps of activating a switch as the hood frame portion is tilted downward; and preventing the cooling shuttle from moving while the switch is actuated.

3. The method of claim 2 further including the steps of tilting the hood frame portion upward; and deactivating the switch as the hood frame portion is tilted upward.

4. The method of claim 1 wherein the step of tilting the hood frame portion includes actuating an air cylinder with a solenoid valve.

* * * * *